United States Patent
Bang et al.

(10) Patent No.: US 10,150,462 B2
(45) Date of Patent: Dec. 11, 2018

(54) DCT SHIFTING CONTROL METHOD FOR VEHICLE

(71) Applicant: Hyundai Motor Company, Seoul (KR)

(72) Inventors: Jae Sung Bang, Yongin-si, Gyeonggi-do (KR); Jae Kyu Hyun, Daegu (KR); Sang Joon Kim, Seoul (KR); Tae Hee Jung, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 283 days.

(21) Appl. No.: 15/081,247

(22) Filed: Mar. 25, 2016

(65) Prior Publication Data

US 2017/0101083 A1    Apr. 13, 2017

(30) Foreign Application Priority Data

Oct. 8, 2015  (KR) .................. 10-2015-0141304

(51) Int. Cl.
  *B60W 20/10*      (2016.01)
  *B60W 20/30*      (2016.01)
  (Continued)

(52) U.S. Cl.
  CPC ............. *B60W 20/10* (2013.01); *B60K 6/387* (2013.01); *B60K 6/547* (2013.01); *B60W 10/02* (2013.01);
  (Continued)

(58) Field of Classification Search
  CPC .................. B60K 6/387; B60K 6/547; B60K 2006/4825; B60W 10/02; B60W 10/06;
  (Continued)

(56) References Cited

U.S. PATENT DOCUMENTS 6,009,768 A *  1/2000  Hoshiya ............. F16H 61/0403
                                                 477/124
8,777,813 B2 *  7/2014  Kim ...................... B60W 10/02
                                                 477/174
(Continued)

FOREIGN PATENT DOCUMENTS

JP    2007-170559 A    7/2007
JP    2008-32184       2/2008
(Continued)

OTHER PUBLICATIONS

Korean Office Action dated Sep. 26, 2017 from the corresponding Korean Application No. 10-2015-0141304, 2 pp.

*Primary Examiner* — Jacob S. Scott
*Assistant Examiner* — Tinh Dang
(74) *Attorney, Agent, or Firm* — Brinks Gilson & Lione

(57) ABSTRACT

A DCT shifting control method of a vehicle includes: a temporary engaging step that engages an N-3 stage gear having a gear ratio larger than an N stage gear that is a currently engaged gear; a first torque switching step that starts to slip a first clutch engaged with the N-3 stage gear and disengages a second clutch engaged with the N stage gear that is the currently engaged gear; a synchronization speed adjusting step that synchronizes a speed of a power source of a vehicle with a desired input shaft speed by controlling the power source of the vehicle, disengages the N stage gear, and engages the N-2 stage gear that is the desired gear, with the slip of the first clutch maintained; and a second torque switching step that finishes shifting by disengaging the first clutch and engaging the second clutch.

17 Claims, 5 Drawing Sheets

(51) Int. Cl.
  *B60W 10/02* (2006.01)
  *B60W 10/113* (2012.01)
  *B60W 10/06* (2006.01)
  *B60W 10/08* (2006.01)
  *B60W 30/19* (2012.01)
  *B60K 6/387* (2007.10)
  *B60K 6/547* (2007.10)
  *F16H 61/04* (2006.01)
  *F16H 61/688* (2006.01)
  *B60K 6/48* (2007.10)

(52) U.S. Cl.
  CPC ............ *B60W 10/06* (2013.01); *B60W 10/08* (2013.01); *B60W 10/113* (2013.01); *B60W 20/30* (2013.01); *B60W 30/19* (2013.01); *F16H 61/0437* (2013.01); *F16H 61/688* (2013.01); *B60K 2006/4825* (2013.01); *B60W 2510/0208* (2013.01); *B60W 2510/1005* (2013.01); *B60W 2510/1015* (2013.01); *B60W 2710/025* (2013.01); *B60W 2710/0644* (2013.01); *B60W 2710/0666* (2013.01); *B60W 2710/081* (2013.01); *B60W 2710/083* (2013.01); *B60W 2710/1005* (2013.01); *B60Y 2200/92* (2013.01); *B60Y 2300/426* (2013.01); *B60Y 2300/43* (2013.01); *B60Y 2300/60* (2013.01); *B60Y 2300/70* (2013.01); *B60Y 2400/428* (2013.01); *F16H 2061/0444* (2013.01); *Y02T 10/6252* (2013.01); *Y02T 10/6286* (2013.01); *Y10S 903/914* (2013.01); *Y10S 903/919* (2013.01); *Y10S 903/93* (2013.01)

(58) Field of Classification Search
  CPC .... B60W 10/08; B60W 10/113; B60W 20/10; B60W 20/30; B60W 30/19; B60W 2510/0208; B60W 2510/1005; B60W 2510/1015; B60W 2710/025; B60W 2710/0644; B60W 2710/0666; B60W 2710/081; B60W 2710/083; B60W 2710/1005; F16H 61/0437; F16H 61/688; F16H 2061/0444; B60Y 2200/92; B60Y 2300/426; B60Y 2300/43; B60Y 2300/60; B60Y 2300/70; B60Y 2400/428; Y02T 10/6252; Y02T 10/6286; Y10S 903/914; Y10S 903/919; Y10S 903/93
  See application file for complete search history.

(56) References Cited

U.S. PATENT DOCUMENTS

2011/0184611 A1* 7/2011 Mitchell ............... F16H 61/061
  701/54
2018/0112770 A1* 4/2018 Hansson ............... F16H 61/688

FOREIGN PATENT DOCUMENTS

| JP | 2013-006583 A | 1/2013 |
| JP | 2013-060043 A | 4/2013 |
| JP | 2014-218136 A | 11/2014 |
| KR | 10-2010-0089221 | 8/2010 |
| KR | 10-2012-0136608 | 12/2012 |
| KR | 10-1459928 | 11/2014 |

* cited by examiner

DCT SHIFTING CONTROL METHOD FOR VEHICLE

CROSS REFERENCE TO RELATED APPLICATION

The present application claims priority to and the benefit of Korean Patent Application No. 10-2015-0141304, filed Oct. 8, 2015, which is incorporated herein by reference in its entirety.

FIELD

The present disclosure relates to shifting gears while a TMED (Transmission Mounted Electric Device) type hybrid vehicle equipped with a DCT (Dual Control Transmission) is driven.

BACKGROUND

The statements in this section merely provide background information related to the present disclosure and may not constitute prior art.

In a TMED type hybrid vehicle equipped with a DCT, a motor operated by electricity is mounted on a DCT and an engine clutch is disposed between the motor and an engine, in which the power from the motor can be supplied to odd-numbered shafts for shifting to odd-numbered gears and even-numbered shafts for shifting to even-numbered gears through two clutches of the DCT, and the clutch for supplying power to the odd-numbered shafts is called an odd-numbered clutch and the clutch for supplying power to the even-numbered shafts is called an even-numbered clutch.

In the DCT described above, gears are sequentially disposed between the odd-numbered shafts and the even-numbered shafts, so shifting is sequentially made to the gears on different shafts by engaging/disengaging the odd-numbered clutch and the even-numbered clutch, and this type of shifting is called different-shaft shifting because two shafts are used for shifting.

Since such sequential shifting is biaxial shifting, it is possible to make smooth shifting without torque reduction of driving wheels due to clutch-to-clutch switching by disengaging the clutch for the current engaged gear and engaging the clutch for a new desired gear to be engaged, after the new desired gear on the shaft disengaged from the corresponding clutch. Accordingly, if possible, the DCT makes this sequential shifting, and for skip shifting that skips the next gear when a vehicle speed is rapidly changed or a vehicle is rapidly accelerated by a driver, it may be required to shift to another gear on the same shaft.

This type of shifting on the same shaft is called same-shaft shifting, and of this type of shifting, in order to make power-off down-same-shaft shifting that shifts to a lower gear having a larger gear ratio without an accelerator pedal pressed down by a driver, it is required to disengage the current engaged gear with the corresponding clutch disengaged, to engage a new desired gear, and then to engage the clutch. However, the corresponding clutch is engaged after slip synchronization for removing a speed difference because the speed of the input shaft mounted with the desired gear is higher than the speed of a driving source of the vehicle such as an engine or a motor, so shifting takes long time in this case.

SUMMARY

The present disclosure proposes a DCT shifting control method for a vehicle that can improve drivability of a vehicle with quick power-off down-same-shaft shifting by quickly synchronizing the speed of a driving source of the vehicle with the speed of the input shaft of a desired gear when power-off down-same-shaft shifting is performed in a TMED type hybrid vehicle including a DCT.

According to one aspect of the present disclosure, there is provided a DCT shifting control method of a vehicle that includes: a shifting start determining step in which a controller determines whether power-off down-same-shaft shifting is required; a temporary engaging step in which the controller engages an N-3 stage gear having a gear ratio larger than an N stage gear that is a currently engaged gear; a first torque switching step in which the controller starts to slip a first clutch engaged with the N-3 stage gear and disengages a second clutch engaged with the N stage gear that is the currently engaged gear, after the temporary engaging step; a synchronization speed adjusting step in which the controller synchronizes a speed of a power source of a vehicle with a desired input shaft speed obtained by multiplying a current input speed with a gear ratio of an N-2 stage gear that is a desired gear by controlling the power source of the vehicle, disengages the N stage gear, and engages the N-2 stage gear that is the desired gear, with the slip of the first clutch maintained after the first torque switch step; and a second torque switching step in which the controller finishes shifting by disengaging the first clutch and engaging the second clutch.

The controller may shift to a neutral gear from the N stage gear that is the currently engaged gear by controlling a shifting actuator in the synchronization speed adjusting step, engage the N-2 stage gear that is the desired gear, and adjust the speed of a power source by controlling at least a motor of power sources of a vehicle including the motor in the synchronization speed adjusting step.

The controller may perform a shifting preparing step before performing the first torque switching step after the shifting start determining step, and the shifting preparing step may include a torque adjusting step that adjusts and maintain torque of the driving source at predetermined preparatory torque.

An inertia moment of a driving system may be determined by inertia moments of all parts in a path through which power is transmitted from the motor to a motor-sided part of the second clutch that is a disengaged clutch when an engine clutch is disengaged between an engine and the motor, and may be determined by inertia moments of all parts in a path through which power is transmitted from the engine to the motor and the motor-sided part of the second clutch through the engine clutch when the engine clutch is engaged.

Before the second clutch is disengaged by the first torque switching step after the shifting start determining step, the controller may obtain first offset by subtracting the current input shaft speed, which is obtained by multiplying a gear ratio of the currently engaged gear by a current output shaft speed, from a desired input shaft speed; may determine a desired synchronization completion time that is time to be taken from a point of start time of the synchronization speed adjusting step to a point of time when shifting is finished; may obtain a desired parallel value by subtracting the initial offset from the desired input shaft speed in the synchronization speed adjusting step; and may set a desired speed that a driving source speed is supposed to follow by adding an additional value, which is set to make a profile gradually increasing from zero to an initial offset value during the desired synchronization completion time, to the desired parallel value at every control cycle, thereby performing feedback control on the driving source speed in accordance with the desired speed.

The desired synchronization completion time may be divided into at least three periods and different rates of change of the additional value may be set in the periods in the synchronization speed adjusting step.

In the three periods of the desired synchronization completion time, the rate of change of the additional value may be the largest in a middle period, and the rate of change of the additional value may be smaller in an early stage period and a last stage period at both sides of the middle period, than the rate of change in the middle period, in the synchronization speed adjusting step.

The rate of change of the additional value in the middle stage may be set as a value obtained by dividing maximum torque of the driving source by an inertia moment of a driving system, or less; the driving source may be only the motor when an engine clutch between an engine and the motor is disengaged, may be the engine and the motor when the engine clutch is engaged, and may be an HSG, the engine, and the motor when the engine clutch is engaged and the HSG is connected to the engine to be able to supply power; and the inertia moment of the driving system may be determined by inertia moments of all parts in a path through which power is transmitted from the motor to a motor-sided part of the second clutch when the engine clutch is disengaged, and may be determined by inertia moments of all parts in a path through which power is transmitted from an engine to the motor and the motor-sided part of the second clutch through the engine clutch when the engine clutch is engaged.

Changes of the additional values set in the periods of the desired synchronization completion time may be processed by a low-pass filter so that the additional values are smoothly changed among the periods.

Changes of the additional values set in the periods of the desired synchronization completion time may be processed by spline interpolation so that the additional values are smoothly changed among the periods.

The method may further include: a feedback value calculating step of calculating a feedback control value, using a difference between the desired speed and a rotational speed of a plant showing a driving system as a control error; a disturbance removing step or removing disturbance and calculating an estimated error for converting the driving system into an ideal nominal state, in response to a final control value for controlling the plant, the disturbance accompanying operation of the plant, and a measured rotational speed; and a control value calculating step of calculating a final control value by adding the feedback control value to and subtracting the estimated error from a feedforward value obtained by multiplying a differential value of the desired speed by the inertia moment of the driving system.

The driving system may be determined by all parts in the path through which power is transmitted from the motor to the motor-sided part of the second clutch when the engine clutch is disengaged, but may be determined by all parts in the path through which power is transmitted from the engine to the motor and the motor-sided part of the second clutch through the engine clutch, or all parts connected to the engine to transmit torque, when the engine clutch is engaged.

In the disturbance removing step, a first processed value may be created by processing the final control value with a low-pass filter Q(S) that follows the following equation, $$Q(s) = \frac{\sum_{i=1}^{m} b_i s^i}{\sum_{j=1}^{n} a_j s^j}$$

a second processed value may be created by inputting a measured rotational speed of the plant to $G_n^{-1}(S)$ for a nominal plant $G_n(S)$ for the plant G showing the driving system and then processing with the low-pass filter Q(S), the estimated error may be calculated by subtracting the first processed value from the second processed value, and $a_j$ and $b_i$ may be set to satisfy $|Q(s=j\omega)|\approx 1$ under a maximum frequency included in the disturbance, the nominal plant may satisfy $G_n(S)=1/(J^*s)$, and $G_n^{-1}(s)$ may be $(J^*s)$.

According to another aspect of the present disclosure, there is provided a DCT shifting controller for a vehicle that includes: a shifting request determining unit determining whether power-off down-same-shaft shifting is required in a TMED type hybrid vehicle equipped with a DCT; a shifting instructing unit of, when the power-off down-same-shaft shifting is required, controlling a shifting actuator to engage an N-3 stage gear having a gear ratio larger than an N stage gear that is a currently engaged gear, starting to slip a first clutch connected to the N-3 stage gear, and disengaging the N stage gear that is the currently engaged gear and engaging an N-2 stage gear, with a second clutch, which is connected to the N stage gear that is the currently engaged gear, disengaged; a clutch instructing unit of controlling the clutches; and a driving source instructing unit of controlling driving sources of a vehicle to synchronize a driving source speed with a desired input shaft speed obtained by multiplying a current input shaft speed with a gear ratio of a desired gear, when the second clutch connected to the currently engaged gear is disengaged in accordance with a request for the power-off down-same-shaft shifting.

The driving source instructing unit may include an object setting unit obtaining initial offset by subtracting a current input shaft speed, which is obtained by multiplying a gear ratio of the currently engaged gear by the current output shaft speed, from the desired input shaft speed before the second clutch is disengaged in the power-off down-same-shaft shifting; determining a desired synchronization completion time that is taken from a point of time when the currently engaged gear is disengaged to a point of time when a speed of a driving source is synchronized with the desired input shaft speed; and setting a desired speed that the input shaft speed is supposed to follow by obtaining a desired parallel value that is a difference from the desired input shaft speed to the initial offset and by adding an additional value, which is set to make a profile gradually increasing from zero to a initial offset value during the desired synchronization completion time, to the desired parallel value at every control cycle.

The driving source instructing unit may further include: a feedback value calculating unit calculating a feedback control value, using a difference between the desired speed and a rotational speed of a plant showing a driving system as a control error; a disturbance observing unit removing disturbance and calculating an estimated error for converting the driving system into an ideal nominal state, in response to a final control value for controlling the plant, the disturbance accompanying operation of the plant, and a measured rotational speed; and a control value calculating unit calculating a final control value by adding the feedback control value to and subtracting the estimated error from a feedforward value obtained by multiplying a differential value of the desired speed by inertia moment of the driving system.

The disturbance observing unit may create a first processed value by processing the final control value with a low-pass filter Q(S) that follows the following equation, $$Q(s) = \frac{\sum_{i=1}^{m} b_i s^i}{\sum_{j=1}^{n} a_j s^j}$$

a second processed value may be created by inputting a measured rotational speed of the plant to $G_n^{-1}(S)$ for a nominal plant $G_n(S)$ for the plant G showing the driving system and then processing with the low-pass filter Q(S), the estimated error may be calculated by subtracting the first processed value from the second processed value, and $a_j$ and $b_i$ may be set to satisfy $|Q(s=j\omega)|\approx 1$ under a maximum frequency included in the disturbance, the nominal plant may satisfy $G_n(S)=1/(J^*s)$, and $G_n^{-1}(s)$ may be $(J^*s)$.

According to the present disclosure, it is possible to improve drivability of a vehicle with quick power-off down-same-shaft shifting by quickly synchronizing the speed of a driving source of the vehicle with the speed of the input shaft of a desired gear when power-off down-same-shaft shifting is performed in a TMED type hybrid vehicle including a DCT. Further, it is possible to maintain an operation region of a motor at a relatively high level by relatively quickly shifting to lower gears in comparison to sequential shifting, and accordingly, it is possible to increase regenerative braking in shifting before a vehicle is stopped.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
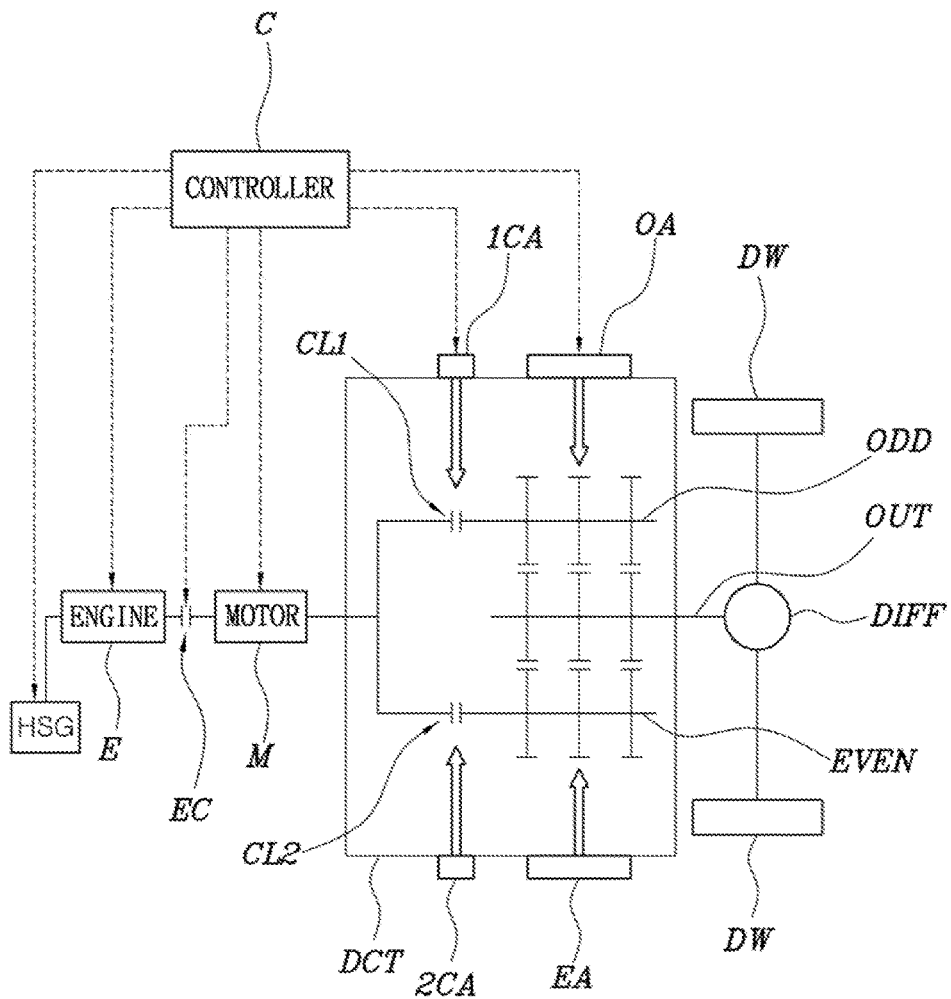
FIG. 1 is a diagram showing an exemplary configuration of a TMED type hybrid vehicle equipped with a DCT.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a diagram showing an exemplary configuration of a TMED type hybrid vehicle equipped with a DCT to which the present disclosure can be applied, in which an engine clutch EC is disposed between an engine E and a motor M to connect/disconnect power and an HSG (Hybrid Starter Generator) is connected to the engine, so, even with the engine clutch disengaged, the engine can be started and electricity can be generated from engine power.

The motor is connected to the DCT, the DCT has an odd-numbered shaft ODD, an even-numbered shaft EVEN, and an output shaft OUT; a first clutch CL1 is disposed between the motor and the odd-numbered shaft of the DCT; a second clutch CL2 is disposed between the motor and the even-numbered shaft of the DCT, a first clutch actuator 1CA and a second clutch actuator 2CA for controlling the first clutch and the second clutch, respectively, are provided; and an odd-number shifting actuator OA and an even-number shifting actuator EA for engaging/disengaging the gears on the odd-numbered shaft and the gears on the even-numbered shaft, respectively, are provided, and driving wheels DW are connected to the output shaft through a differential DIFF.

A controller C can control the HSG, the engine, the engine clutch, the motor, the first clutch actuator, the second clutch actuator, the even-number shifting actuator, and the odd-number shifting actuator.

Obviously, although one controller C controls those parts in the figure, the controller may be divided into a plurality of controllers, for example, an engine controller for controlling the engine, a motor controller for controlling the motor, a transmission controller for controlling the parts in the DCT, and a hybrid controller for controlling the engine controller, the motor controller, and the transmission controller in a higher class. However, for making the present disclosure clear, one representative controller may control all the parts as a concept including all of changes of the configuration of the controller, so the configuration of the controller should not be construed as being limited to that shown in the figure.

Figure 2:
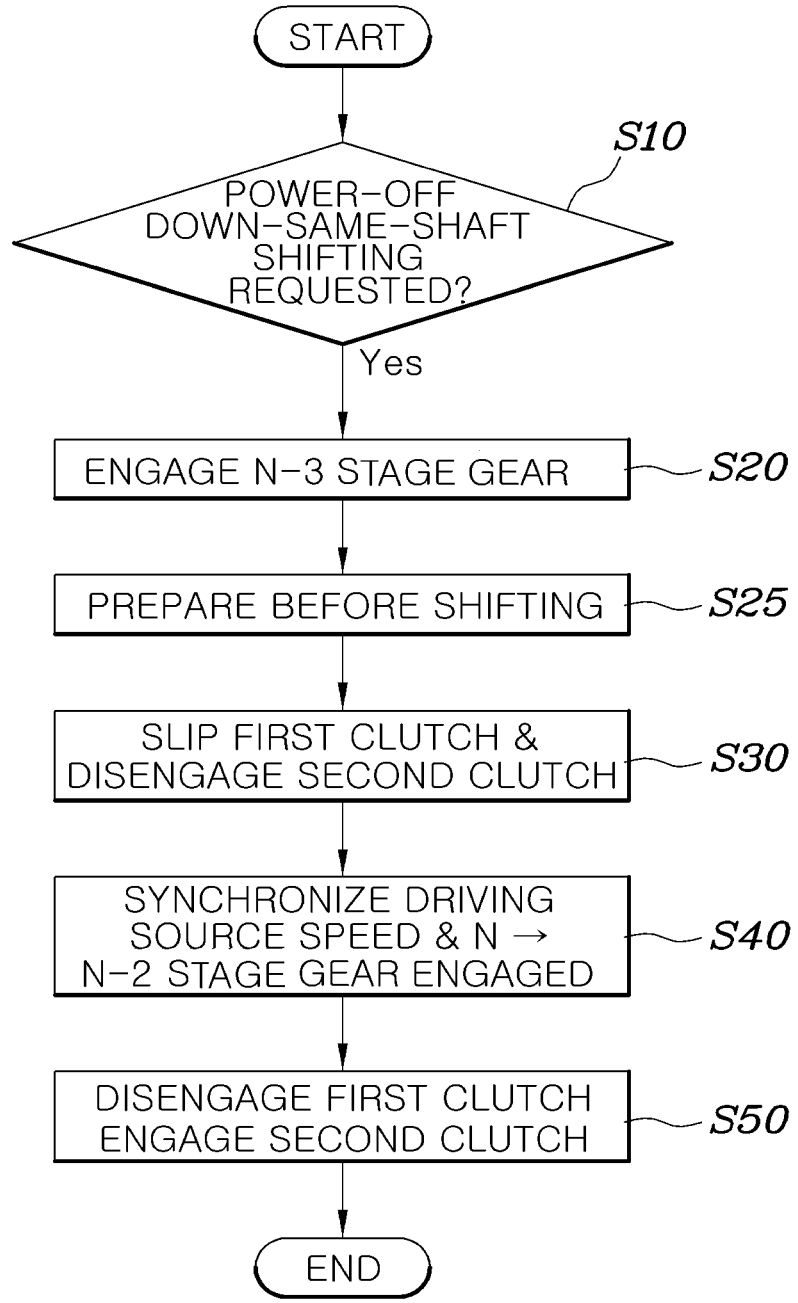
FIG. 2 is a flowchart illustrating an embodiment of a DCT shifting control method of a vehicle according to the present disclosure.

FIG. 2 is a flowchart illustrating an embodiment of a DCT shifting control method of a vehicle according to the present disclosure. The method includes: a shifting start determining step in which a controller determines whether power-off down-same-shaft shifting is required (S10); a temporary engaging step in which the controller engages an N-3 stage gear having a gear ratio larger than an N stage gear that is the currently engaged gear (S20); a first torque switching step in which the controller starts to slip a first clutch engaged with the N-3 stage gear and disengages a second clutch engaged with the N stage gear that is the currently engaged gear, after the temporary engaging step (S30); a synchronization speed adjusting step in which the controller synchronizes the speed of a driving source of a vehicle with a desired input shaft speed obtained by multiplying the current input speed by the gear ratio of an N-2 stage gear that is a desired gear by controlling the driving source of the vehicle, disengages the N stage gear, and engages the N-2 stage gear that is the desired gear, with the slip of the first clutch maintained after the first torque switching step (S40); and a second torque switching step (S50) in which the controller finishes shifting by disengaging the first clutch and engaging the second clutch.

Figure 3:
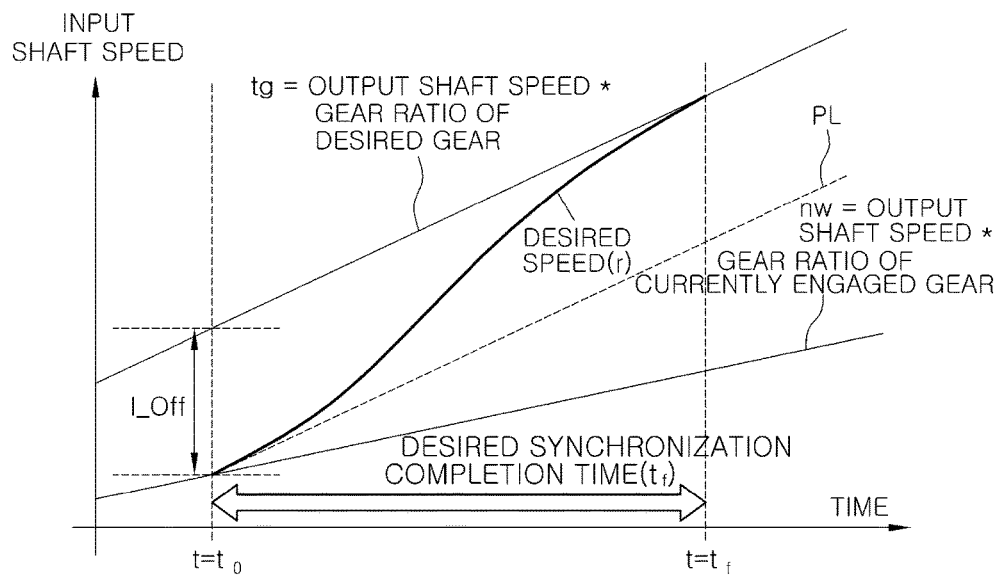
FIG. 3 is a graph showing changes in input shaft speed with lapse of time for illustrating a same-shaft shifting process of the present disclosure.

According to the present disclosure, as shown in FIG. 3, for example, when there is a need for same-shaft shifting from a sixth gear to a fourth gear, shifting to a fifth gear is skipped and shifting directly from an N stage gear (sixth gear) that is the currently engaged gear to an N-2 stage gear (fourth gear) that is the desired gear is performed. That is, an N-3 stage gear (third gear) having a gear ratio three-step larger than the N stage gear that is the current engaged gear is engaged, the first clutch engaged with the N-3 stage gear is slipped, and the second clutch engaged with the sixth gear is disengaged. Further, the speed of a driving source of a vehicle is actively synchronized with the speed of the even-numbered shaft with the fourth gear engaged that is a desired input shaft speed, the sixth gear is disengaged and the fourth-gear is engaged, the second clutch that has already been synchronized is engaged and the first clutch is disengaged immediately after the fourth-gear is engaged, thereby quickly completing shifting.

That is, when it is required to shift from the sixth gear that is the currently engaged gear to the fourth gear, it is possible to more quickly synchronize the speed of a driving source of a vehicle with a desired input shaft speed by disengaging the second clutch connected to the currently engaged gear, skipping the first clutch connected by engaging the third gear, and actively increasing the speed of the driving source of the vehicle to the desired input shaft speed. Further, since the second clutch is disengaged, by disengaging the currently engaged gear, engaging the fourth gear that is the N-2-gear, and engaging the second clutch and disengaging the first clutch right after the fourth gear is engaged, shifting is quickly completed.

As the first clutch connected by engaging the third gear is skipped, the speed of the first clutch increases the speed of the driving source because the speed of the first clutch is higher than the speed of the driving speed, so the speed of the driving source can be more quickly synchronized with the desired input shaft speed.

Obviously, when the speed of the driving source of a vehicle rapidly increases, the rotational speed range of the motor increases in comparison to sequential shifting, so more regenerative braking can be provided under the same conditions.

The currently engaged gear is referred to as an N stage gear and other gears that the transmission can shift to are expressed by addition or subtracting integers to or from N. Further, it is exemplified in this embodiment that the fourth gear that is the N-2 stage gear from the sixth gear that is the currently engaged gear is the desired gear. When the currently engaged gear is the fifth gear, the desired gear is the third gear that is the N-2 stage gear, so the first clutch and the second clutch are operated in opposite way.

The fourth gear and the sixth gear, which are both even-numbered gears, are mounted on the even-numbered shaft and connected to the motor through the second clutch, and they may be connected to the engine by an engine clutch, whereas the fifth gear, which is an odd-numbered gear, is mounted on the odd-numbered shaft and connected to the motor through the first clutch, and it may be connected to the engine by the engine clutch.

The "output shaft" means the output shaft of the DCT.

The controller C shifts to the neutral gear from the N stage gear that is the currently engaged gear by controlling the shifting actuator in the synchronization speed adjusting step (S40), engages the N-2 stage gear that is the desired gear, and adjusts the speed of a driving source by controlling at least the motor of driving sources of a vehicle including the motor in the synchronization speed adjusting step (S40).

The driving sources are all power sources that can supply power for driving a vehicle, and as shown in FIG. 1, they may be not only an engine, but an HSG, an engine, and a motor in the configuration in which the engine can be started and the engine power can be assisted by the HSG, but only the engine and motor may be the driving sources in a hybrid vehicle without an HSG.

Further, the controller C performs a shifting preparing step (S25) before performing the first torque switching step (S30) after the shifting start determining step (S10) in this embodiment. Although the shifting preparing step (S25) is performed after the temporary engaging step (S20) in FIG. 2, the shifting preparing step (S25) may be actually completed simultaneously with the temporary engaging step (S20).

The shifting preparing step (S25) includes a torque adjusting step that adjusts and maintains the torque of the driving source at predetermined preparatory torque.

The torque adjusting step prevents a rapid and large change of the speed of a driving source due to a large change of load when the second clutch is disengaged, by appropriately adjusting the torque of the driving source in advance before disengaging the second clutch connected with the currently engaged gear.

Accordingly, when referring to FIG. 3, the preparatory torque a can be obtained by multiplying the inertia moment J of a driving system by the acceleration of the driving source, as in the following equation.

$$\alpha = J \cdot \frac{d}{dt}(nw)\bigg|_{t=t_0}$$

where nw is the current input shaft speed that is the speed of an even-numbered shaft that is currently the input shaft before shifting, and can be obtained by multiplying the current output shaft speed by the gear ratio of the currently engaged gear, in which the second clutch is not disengaged yet, so nw is the same as the current speed of the driving source.

Figure 4:
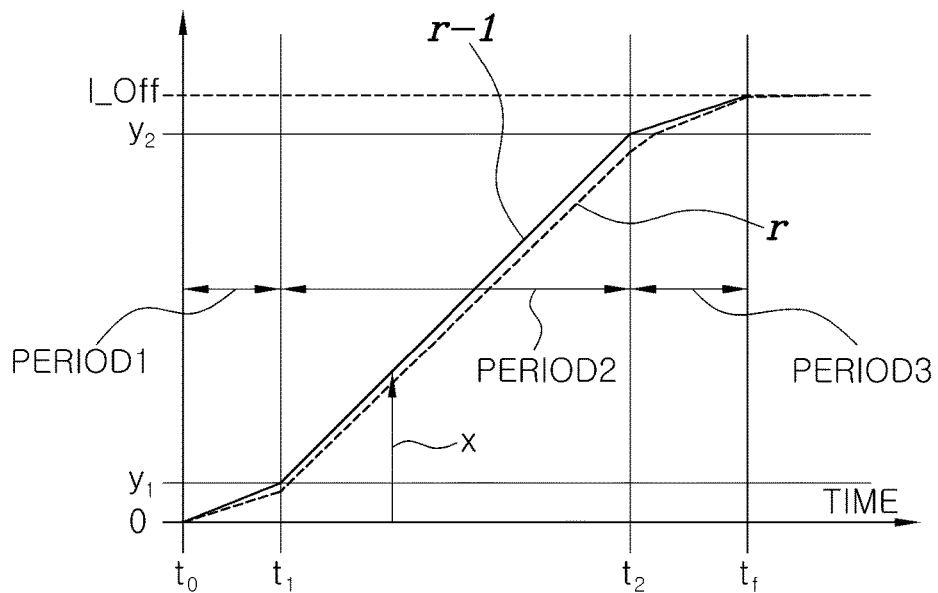
FIG. 4 is a graph illustrating a method of setting an additional value for setting a desired speed that an input shaft speed is supposed to follow within a desired synchronization completion time.
Figure 5:
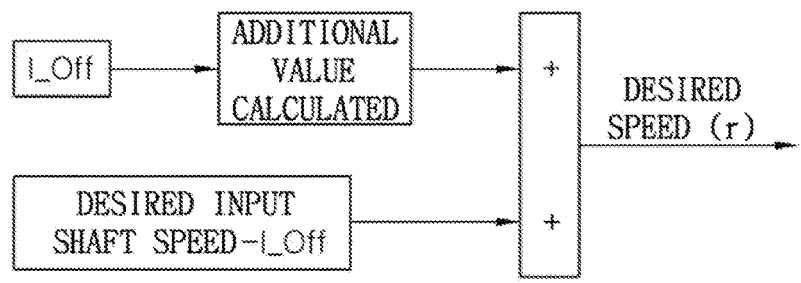
FIG. 5 is a block diagram illustrating a concept of calculating a desired speed using the additional value of FIG. 4.

For reference, tg in FIG. 4 is a desired input shaft speed showing the input shaft speed after shifting and can be obtained by multiplying the current output shaft speed by the gear ratio of the desired gear.

The inertia moment J of a driving system is determined by the inertia moments of all parts in the path through which power is transmitted from the motor to the motor-sided part of the disengaged second clutch when the engine clutch is disengaged between the engine and the motor, but is determined by the inertia moments of all parts in the path through which power is transmitted from the engine to the motor and the motor-sided part of the second clutch through the engine clutch when the engine clutch is engaged.

For reference, the motor-sided part of the second clutch actually means a clutch housing and a pressure plate that are connected to the motor and cover the clutch disc of the second clutch. However, in a common dual clutch in which a first clutch and a second clutch are disposed in a package type in one clutch housing, the motor-sided part of the second clutch means the entire clutch housing of the dual clutch, so it means the same object as the motor-sided part of the first clutch when the first clutch and the second clutch are both disengaged.

The present disclosure employs the following method to smoothly change the speed of a driving source from the current input shaft speed to a desired input shaft speed through the synchronization speed adjusting step (S40) after the first torque switching step (S30).

Before the second clutch connected to the currently engaged gear is disengaged by the first torque switching step (S30) after the shifting start determining step (S10), the controller obtains first offset I_Off by subtracting the current input shaft speed nw, which is obtained by multiplying the gear ratio of the currently engaged gear by the current output shaft speed, from the desired input shaft speed tg; determines a desired synchronization completion time $t_f$ that is time to be taken from the point of start time of the synchronization speed adjusting step (S40) to the point of time when shifting is finished; obtains a desired parallel value PL by subtracting the initial offset I_OFF from the desired input shaft speed tg in the synchronization speed adjusting step (S40); and sets a desired speed 'r' that a driving source speed is supposed to follow by adding an additional value 'x', which is set to make a profile gradually increasing from zero to the initial offset value during the desired synchronization completion time, to the desired parallel value at every control cycle, thereby performing feedback control on the driving source speed in accordance with the desired speed 'r'.

That is, in the synchronization speed adjusting step (S40), the initial offset is obtained at the early stage, the total amount of the current diving source speed supposed to change during the desired synchronization completion time is determined, and the additional value is added to the desired parallel value through a process for smoothly changing the additional value within the initial offset, thereby obtaining the profile that a change of the driving source speed is supposed to follow.

FIG. 4 illustrates a method of how to determine the additional value during the desired synchronization completion time with the initial offset obtained, as described above, in which the desired synchronization completion time is divided into at least three periods and different rates of change of the additional value are set in the periods.

For reference, although the desired synchronization completion time is divided into total three periods of a longest period at the middle and two relatively short periods at both sides in FIG. 4, the desired synchronization completion time may be divided into more periods and different additional values may be given to the periods.

In the example shown in FIG. 4, in the three periods of the desired synchronization completion time, the rate of change of the additional value was set larger in the middle period, and the rate of change of the additional value was set smaller in the early stage period and the last stage period at both sides of the middle period, than the rate of change in the middle period.

Accordingly, in the desired synchronization completion time, the additional value is gradually increased such that the driving source speed smoothly changes from the current input shaft speed nw without shock in the early stage, the driving speed is relatively quickly changed to provide rapid shifting response in the middle stage, and the driving source speed is smoothly synchronized with thee desired input shaft speed tg without shock in the last stage, so it is possible to achieve both of rapid shifting response and smooth shifting.

The rate of change of the additional value in the middle stage is set as a value obtained by dividing the maximum torque of the driving source by the inertia moment of the driving system, or less.

On the other hand, the speed change of the driving source during the desired synchronization completion time may be achieved by determining a plurality of periods for the speed change and setting corresponding inclinations such that the time needed for shifting is correspondingly determined, instead of the method of setting a desired synchronization completion time first, dividing the desired synchronization completion time into periods, and giving different rates of change of the driving source speed to the periods.

The driving source means only the motor when the engine clutch between the engine and the motor is disengaged, means the engine and the motor when the engine clutch is engaged, and means the HSG, engine, and motor when the engine clutch is engaged and the HSG is connected to the engine to be able to supply power.

The inertia moment of a driving system is determined by the inertia moments of all parts in the path through which power is transmitted from the motor to the motor-sided part of the second clutch when the engine clutch is disengaged, and is determined by the inertia moments of all parts in the path through which power is transmitted from the engine to the motor and the motor-sided part of the second clutch through the engine clutch when the engine clutch is engaged.

Smoother shifting may be achieved by processing changes of the additional values set in the periods of the desired synchronization completion time through a low-pass filter so that the additional values are smoothly changed among the periods.

For reference, in FIG. 4, the line indicated by r−1 considers only the inclinations in the periods before being processed by a low-pass filter, and the inclinations processed by a low-pass filter are indicated by the dotted line, which shows the desired speed 'r'.

Obviously, instead of a low-pass filter, spline interpolation may be applied to the additional values such that the additional values are smoothly changed through the periods.

Feedback control is performed on the driving source speed in accordance with a change of the desired speed 'r' of the driving force in the synchronization speed adjusting step (S40).

The feedback control in the synchronization speed adjusting step (S40) includes: a feedback value calculating step that calculates a feedback control value $U_{fb}$, using the difference between the desired speed 'r' and the rotational speed of a plant G showing the driving system as a control error 'e' (S41); a disturbance removing step that removes disturbance 'd' and calculates an estimated error $U_d$ for converting the driving system G into an ideal nominal state, in response to a final control value U for controlling the plant G, the disturbance 'd' accompanying operation of the plant G, and a measured rotational speed 'y' (S43); and a control value calculating step that calculates the final control value U by adding the feedback control value $U_{fb}$ to and subtracting the estimated error $U_d$ from a feedforward value $U_{ff}$ obtained by multiplying the differential value of the desired speed by the inertia moment J of the driving system (S45).

That is, the feedforward value $U_{ff}$ obtained by multiplying the differential value of the desired speed 'r' by the inertia moment J of the driving system is torque to be applied to the plant to obtain the speed of the plant G that is a driving system, as intended, and basically, feedback control is achieved by measuring the rotational speed of the plant controlled in accordance with the feedforward value, calculating the feedback control value $U_{fb}$ using the control error 'e' that is the difference from the desired speed, and adding the feedback control value to the feedforward value and using the sum for plant control.

By adding the estimated error $U_d$ to the feedforward value $U_{ff}$ and the feedback control value $U_{fb}$ through the disturbance removing step using a disturbance observing unit in the basic feedback control, the final control value U for controlling the plant G is consequently calculated.

In the disturbance removing step, a first processed value is created by processing the final control value U with a low-pass filter Q(S) that follows the following equation.

$$Q(s) = \frac{\sum_{i=1}^{m} b_i s^i}{\sum_{j=1}^{n} a_j s^j}$$

A second processed value is created by inputting the measured rotational speed of the plant to $G_n^{-1}(S)$ for a nominal plant $G_n(S)$ for the plant G showing the driving system and then processing it with the low-pass filter Q(S), and the estimated error $U_d$ is calculated by subtracting the first processed value from the second processed value.

In the above equation, $a_j$ and $b_i$ are set to satisfy $|Q(s=j\omega)|\approx 1$ under the maximum frequency $\omega_m$ included in the disturbance 'd', the nominal plant satisfies $G_n(S)=1/(J^*s)$, and $G_n^{-1}(s)$ is $(J^*s)$.

The estimated error $U_d$ is consequently a factor for removing the disturbance 'd' internally and externally applied to the plant G and idealizing the plant G into the nominal plant $G_n(S)$ that is an ideal rigid system and is added to the feedforward value together with the feedback control value to further improve stability and accuracy in control of the plant.

Figure 6:
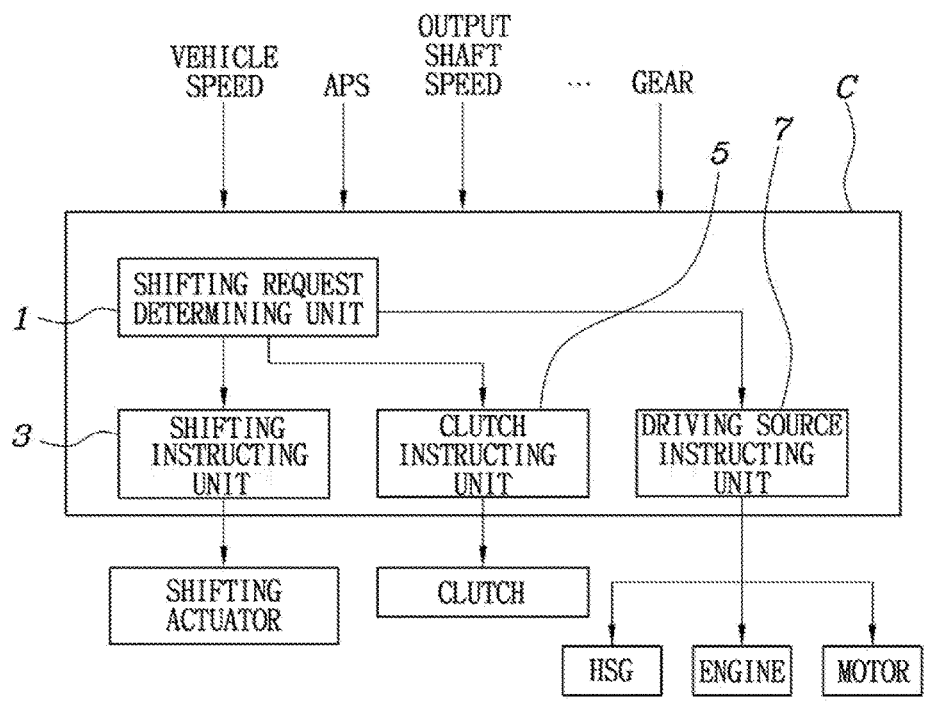
FIG. 6 is a conceptual diagram showing the configuration of a controller of the present disclosure.
Figure 7:
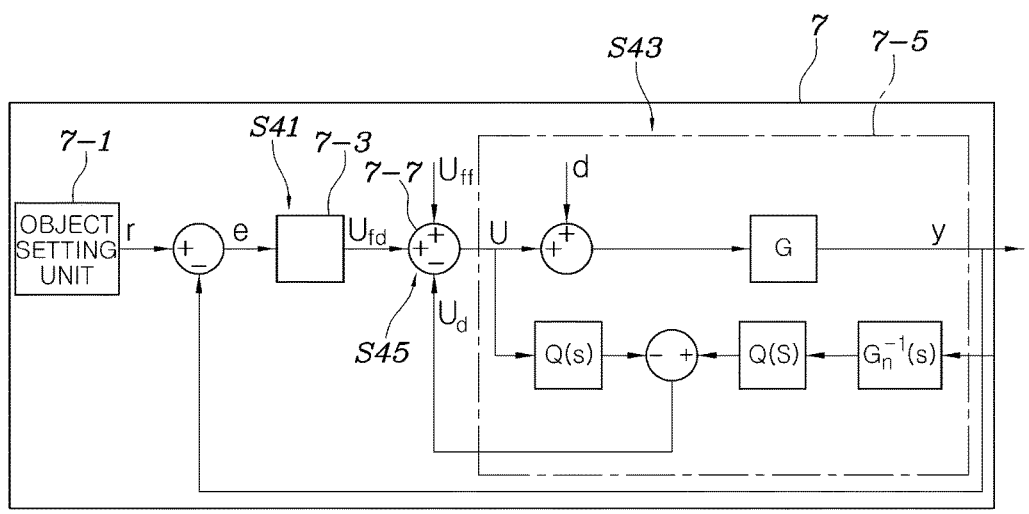
FIG. 7 is a diagram showing in detail a driving source instruction unit of FIG. 2.

Referring to FIG. 6, the controller C of the present disclosure for achieving the control method described above includes: a shifting request determining unit 1 that determines whether power-off down-same-shaft shifting is required in a TMED type hybrid vehicle equipped with a DCT; a shifting instructing unit 3 that, when the power-off down-same-shaft shifting is required, controls a shifting actuator to engage an N-3 stage gear having a gear ratio larger than an N stage gear that is the currently engaged gear, starts to slip a first clutch connected to the N-3 stage gear, and disengages the N stage gear that is the currently engaged gear and engages an N-2 stage gear, with a second clutch, which is connected to the N stage gear that is the currently engaged gear, disengaged; a clutch instructing unit 5 that controls the clutches; and a driving source instructing unit 7 that controls driving sources of a vehicle to synchronize a driving source speed with a desired input shaft speed obtained by multiplying the current input shaft speed by the gear ratio of a desired gear, when the second clutch connected to the currently engaged gear is disengaged in accordance with a request for the power-off down-same-shaft shifting.

The driving source instructing unit 7 includes an object setting unit 7-1 that obtains initial offset by subtracting the current input shaft speed, which is obtained by multiplying the gear ratio of the currently engaged gear by the current output shaft speed, from the desired input shaft speed before the second clutch is disengaged in the power-off down-same-shaft shifting; determines the desired synchronization completion time that is taken from the point of time when the currently engaged gear is disengaged to the point of time when the speed of the driving source is synchronized with the desired input shaft speed; and sets a desired speed that the driving source speed is supposed to follow by obtaining a desired parallel value that is the difference from the desired input shaft speed to the initial offset and by adding an additional value, which is set to make a profile gradually increasing from zero to the initial offset value during the desired synchronization completion time, to the desired parallel value at every control cycle.

The driving source instruction unit 7 includes: a feedback calculating unit 7-3 that calculates a feedback control value $U_{fb}$, using the difference between the desired speed 'r' calculated by the object setting unit 7-1 and the rotational speed of a plant G showing the driving system as a control error 'e'; a disturbance observing unit 7-5 that removes disturbance 'd' and calculates an estimated error $U_d$ for converting the driving system G into an ideal nominal state, in response to a final control value U for controlling the plant G, the disturbance 'd' accompanying operation of the plant G, and a measured rotational speed 'y'; and a control value calculating unit 7-7 that calculates the final control value U by adding the feedback control value $U_{fb}$ to and subtracting the estimated error $U_d$ from a feedforward value $U_{ff}$ obtained by multiplying the differential value of the desired speed 'r' by the inertia moment J of the driving system.

For reference, the feedback calculating unit 7-3 may be a PID controller.

Although a preferred embodiment of the present disclosure has been described for illustrative purposes, those skilled in the art will appreciate that various modifications, additions and substitutions are possible, without departing from the scope and spirit of the present disclosure.

What is claimed is:

1. A Dual Clutch Transmission (DCT) shifting control method of a vehicle, comprising:
a shifting start determining step in which a controller determines whether power-off down-same-shaft shifting is required;
a temporary engaging step in which the controller engages an N-3 stage gear having a gear ratio larger than an N stage gear that is a currently engaged gear;
a first torque switching step in which the controller starts to slip a first clutch engaged with the N-3 stage gear and disengages a second clutch engaged with the N stage gear that is the currently engaged gear, after the temporary engaging step;
a synchronization speed adjusting step in which the controller synchronizes a speed of a power source of the vehicle with a desired input shaft speed obtained by multiplying a current input speed by a gear ratio of an N-2 stage gear that is a desired gear by controlling the power source of the vehicle, disengages the N stage gear, and engages the N-2 stage gear that is the desired gear, with the slip of the first clutch maintained after the first torque switching step; and a second torque switching step in which the controller finishes shifting by disengaging the first clutch and engaging the second clutch.

2. The method of claim 1, wherein the controller is configured to shift to a neutral gear from the N stage gear that is the currently engaged gear by controlling a shifting actuator in the synchronization speed adjusting step, engage the N-2 stage gear that is the desired gear, and adjust the speed of the power source by controlling at least a motor of power sources of a vehicle including the motor in the synchronization speed adjusting step.

3. The method of claim 1, wherein the controller is configured to perform a shifting preparing step before performing the first torque switching step after the shifting start determining step, and the shifting preparing step includes a torque adjusting step that adjusts and maintains torque of a driving source at a predetermined preparatory torque.

4. The method of claim 3, wherein an inertia moment of a driving system is determined by inertia moments of all parts in a path through which power is transmitted from the motor to a motor-sided part of the second clutch that is a disengaged clutch when an engine clutch is disengaged between an engine and the motor, but is determined by inertia moments of all parts in a path through which power is transmitted from the engine to the motor and the motor-sided part of the second clutch through the engine clutch when the engine clutch is engaged.

5. The method of claim 1, wherein before the second clutch is disengaged by the first torque switching step after the shifting start determining step, the controller obtains first offset by subtracting the current input speed, which is obtained by multiplying a gear ratio of the currently engaged gear by a current output shaft speed, from a desired input shaft speed; determines a desired synchronization completion time that is time to be taken from a point of start time of the synchronization speed adjusting step to a point of time when shifting is finished; obtains a desired parallel value by subtracting an initial offset from the desired input shaft speed in the synchronization speed adjusting step; and sets a desired speed that a driving source speed is supposed to follow by adding an additional value, which is set to make a profile gradually increasing from zero to an initial offset value during the desired synchronization completion time, to the desired parallel value at every control cycle, thereby performing feedback control on the driving source speed in accordance with the desired speed.

6. The method of claim 5, wherein the desired synchronization completion time is divided into at least three periods and different rates of change of additional values are set in periods in the synchronization speed adjusting step.

7. The method of claim 6, wherein, in said at least three periods of the desired synchronization completion time, a rate of change of the additional value is a largest rate in a middle period, and the rate of change of the additional value is smaller in an early stage period and a last stage period at both sides of the middle period, than the rate of change in the middle period, in the synchronization speed adjusting step.

8. The method of claim 6, wherein a rate of change of the additional value in a middle stage is set as a value obtained by dividing a maximum torque of the driving source by an inertia moment of a driving system, or less,
wherein the driving source is only the motor when an engine clutch between an engine and the motor is disengaged, and is the engine and the motor when the engine clutch is engaged, and wherein the driving source is an Hybrid Start Generator (HSG), the engine, and the motor when the engine clutch is engaged and the HSG is connected to the engine configured to supply power, and
wherein the inertia moment of the driving system is determined by inertia moments of all parts in a path through which power is transmitted from the motor to a motor-sided part of the second clutch when the engine clutch is disengaged, but is determined by inertia moments of all parts in a path through which power is transmitted from the engine to the motor and the motor-sided part of the second clutch through the engine clutch when the engine clutch is engaged.

9. The method of claim 6, wherein changes of the additional values set in the periods of the desired synchronization completion time are processed by a low-pass filter so that the additional values are smoothly changed among the periods.

10. The method of claim 6, wherein changes of the additional values set in the periods of the desired synchronization completion time are processed by spline interpolation so that the additional values are smoothly changed among the periods.

11. The method of claim 5, further comprising:
a feedback value calculating step of calculating a feedback control value, using a difference between the desired speed and a rotational speed of a plant showing a driving system as a control error;
a disturbance removing step of removing disturbance and calculating an estimated error for converting the driving system into an ideal nominal state, in response to a final control value for controlling the plant, the disturbance accompanying operation of the plant, and a measured rotational speed; and
a control value calculating step of calculating a final control value by adding a feedback control value to and subtracting the estimated error from a feedforward value obtained by multiplying a differential value of the desired speed by an inertia moment of a driving system.

12. The method of claim 11, wherein the driving system is determined by all parts in a path through which power is transmitted from the motor to a motor-sided part of the second clutch when an engine clutch is disengaged, and is determined by all parts in a path through which power is transmitted from the engine to the motor and the motor-sided part of the second clutch through the engine clutch, or all parts connected to the engine to transmit torque, when the engine clutch is engaged.

13. The method of claim 11, wherein in the disturbance removing step, a first processed value is created by processing the final control value (U) with a low-pass filter (Q(S)) that follows the following equation, $$Q(s) = \frac{\sum_{i=1}^{m} b_i s^i}{\sum_{j=1}^{n} a_j s^j}$$

a second processed value is created by inputting a measured rotational speed of the plant to $G_n^{-1}(S)$ for a nominal plant $G_n(S)$ for the plant G showing the driving system and then processing with the low-pass filter (Q(S)),
the estimated error is calculated by subtracting the first processed value from the second processed value, and
$a_j$ and $b_i$ are set to satisfy $|Q(s=j\omega)| \approx 1$ under a maximum frequency included in the disturbance, the nominal plant satisfies $G_n(S)=1/(J^*s)$, and $G_n^{-1}(s)$ is $(J^*s)$.

14. A Dual Clutch Transmission (DCT) shifting controller for a vehicle, comprising:
a shifting request determining unit configured to determine whether power-off down-same-shaft shifting is required in a Transmission Mounted Electric Device (TMED) type hybrid vehicle equipped with a DCT;
a shifting instructing unit configured, when the power-off down-same-shaft shifting is required, to control a shifting actuator to engage an N-3 stage gear having a gear ratio larger than an N stage gear that is a currently engaged gear, configured to start to slip a first clutch connected to the N-3 stage gear, and configured to disengage the N stage gear that is the currently engaged gear and engage an N-2 stage gear, with a second clutch, which is connected to the N stage gear that is the currently engaged gear, disengaged;

a clutch instructing unit configured to control the first and second clutches; and a driving source instructing unit configured to control driving sources of the vehicle to synchronize a driving source speed with a desired input shaft speed obtained by multiplying a current input shaft speed by a gear ratio of a desired gear, when the second clutch connected to the currently engaged gear is disengaged in accordance with a request for the power-off down-same-shaft shifting.

15. The controller of claim 14, wherein the driving source instructing unit includes an object setting unit configured to obtain an initial offset by subtracting a current input shaft speed, which is obtained by multiplying a gear ratio of the currently engaged gear by a current output shaft speed, from the desired input shaft speed before the second clutch is disengaged in the power-off down-same-shaft shifting, wherein the object setting unit is configured to determine a desired synchronization completion time that is taken from a point of time when the currently engaged gear is disengaged to a point of time when a speed of a driving source is synchronized with the desired input shaft speed, and the object setting unit configured to set a desired speed that the driving source speed is supposed to follow by obtaining a desired parallel value that is a difference from the desired input shaft speed to the initial offset and by adding an additional value, which is set to make a profile gradually increasing from zero to a initial offset value during the desired synchronization completion time, to the desired parallel value at every control cycle.

16. The controller of claim 15, wherein the driving source instructing unit further includes:

a feedback value calculating unit configured to calculate a feedback control value, using a difference between the desired speed and a rotational speed of a plant showing a driving system as a control error;

a disturbance observing unit configured to remove disturbance and calculate an estimated error for converting the driving system into an ideal nominal state, in response to a final control value for controlling the plant, the disturbance accompanying operation of the plant, and a measured rotational speed; and a control value calculating unit configured to calculate a final control value by adding the feedback control value to and subtracting the estimated error from a feedforward value obtained by multiplying a differential value of the desired speed by inertia moment of the driving system.

17. The controller of claim 16, wherein the disturbance observing unit is configured to creates a first processed value by processing the final control value with a low-pass filter (Q(S)) that follows the following equation, $$Q(s) = \frac{\sum_{i=1}^{m} b_i s^i}{\sum_{j=1}^{n} a_j s^j}$$

wherein the disturbance observing unit is configured to create a second processed value by inputting a measured rotational speed of the plant to $G_n^{-1}(S)$ for a nominal plant $G_n(S)$ for the plant G showing the driving system and then processing with the low-pass filter (Q(S)), and the disturbance observing unit configured to create the estimated error by subtracting the first processed value from the second processed value, wherein $a_j$ and $b_i$ are set to satisfy $|Q(s=j\omega)|\approx 1$ under a maximum frequency included in the disturbance, the nominal plant satisfies $G_n(S)=1/(J*s)$, and $G_n^{-1}(s)$ is $(J*s)$.

* * * * *